United States Patent [19]

Takahashi

[11] Patent Number: 4,690,116
[45] Date of Patent: Sep. 1, 1987

[54] SYSTEM FOR CONTROLLING AN INTERNAL COMBUSTION ENGINE AND METHOD THEREFOR

[75] Inventor: Nobutaka Takahashi, Yokosuka, Japan

[73] Assignee: Nissan Motor Company, Limited, Kanagawa, Japan

[21] Appl. No.: 908,309

[22] Filed: Sep. 17, 1986

[30] Foreign Application Priority Data

Oct. 17, 1985 [JP] Japan ............................ 60-229930

[51] Int. Cl.⁴ ........................... F02P 5/15; F02P 11/00
[52] U.S. Cl. .................................. 123/425; 364/431.08
[58] Field of Search ........................ 123/425, 435, 479; 73/35; 364/431.08, 431.11

[56] References Cited

U.S. PATENT DOCUMENTS

| 4,131,097 | 12/1978 | Sawada et al. | 123/425 |
| 4,153,019 | 5/1979 | Laubenstein et al. | 123/425 |
| 4,320,729 | 3/1982 | Sawada et al. | 123/425 |
| 4,331,117 | 5/1982 | Ginsburgh | 123/425 |
| 4,356,551 | 10/1982 | Iwase et al. | 123/425 X |
| 4,357,919 | 11/1982 | Hattori et al. | 123/425 |
| 4,462,362 | 7/1984 | Bonitz et al. | 73/35 X |
| 4,517,945 | 5/1985 | Ishigami . | |
| 4,517,952 | 5/1985 | Hosaya . | |
| 4,640,249 | 3/1987 | Kawamura et al. . | |
| 4,658,787 | 4/1987 | Takizawa . | |
| 4,658,789 | 4/1987 | Morita . | |
| 4,660,535 | 4/1987 | Asano . | |

FOREIGN PATENT DOCUMENTS

| 56429 | 5/1978 | Japan | 123/425 |
| 135365 | 8/1983 | Japan | 123/425 |

Primary Examiner—Tony M. Argenbright
Attorney, Agent, or Firm—Schwartz, Jeffery, Schwaab, Mack, Blumenthal & Evans

[57] ABSTRACT

A system and method for controlling a multi-cylinder internal combustion engine includes a plurality of pressure-responsive sensors, each detecting the internal pressure in a corresponding cylinder (or in a corresponding cylinder group), means for determining whether the pressure-responsive sensor for any one of the cylinders (cylinder groups) is malfunctioning on the basis of the readings from the sensors, and means for controlling the ignition timing for each cylinder (each cylinder group) on the basis of the readings from the respective pressure-responsive sensors and retarding by a predetermined retardation offset the ignition timing for any of the cylinders whose associated sensor has failed. The ignition timing of a malfunctioning cylinder is offset by the predetermined offset with respect to the ignition timing for one of the other cylinders (cylinder groups) whose corresponding sensor is operating normally and which has the most retarded ignition timing among such cylinders.

21 Claims, 17 Drawing Figures

SYSTEM FOR CONTROLLING AN INTERNAL COMBUSTION ENGINE AND METHOD THEREFOR

BACKGROUND OF THE INVENTION

The present invention relates to a system and method for controlling an internal combustion engine and more particularly relates to a system and method for controlling the ignition timing of the engine which avoid the disadvantages due to possible malfunction of an ignition timing control system for a cylinder or a cylinder group.

A Japanese Patent Application Unexamined Open Publication No. Sho 53-56429 published on May 22, 1978 discloses a system for controlling the ignition timing of an internal combustion engine in which a plurality of pressure-responsive sensors (combustion pressure vibration sensors) are installed within corresponding engine cylinders and the ignition timing for each engine cylinder is individually corrected on the basis of the readings of the corresponding pressure-responsive sensor so that a crank angular position at which the pressure in the corresponding engine cylinder reaches a maximum coincides with a target value.

In more detail, the crank angular position $\theta_{pmas}$ at which the pressure in each engine cylinder reaches its maximum value usually falls at a crank angular position between 10° and 20° after top dead center (ATDC) (slightly later than the top dead center) although the crank angular position $\theta_{pmas}$ will vary slightly according to the model of the engine. The crank angular position $\theta_{pmas}$ can be adjusted as the ignition timing for the corresponding cylinder changes.

Therefore, the crank angular position $\theta_{pmas}$ is detected from the pressure in the corresponding cylinder and the ignition timing is controlled according to the measured crank angular position $\theta_{pmas}$ so that the crank angular position $\theta_{pmas}$ is adjusted to match a target angle value within a range from 10° to 20° ATDC, thereby maximizing the output torque of the engine and enhancing combustion efficiency.

However, in the ignition timing control system exemplified in the above-identified Japanese Patent Application, the relationship between each engine cylinder and the corresponding pressure-responsive sensor is definitely fixed. That is to say, the ignition timing control for the particular engine cylinder is carried out solely on the basis of the detected output of the single, non-adjustable pressure-responsive sensor.

Hence, if any of the pressure-responsive sensors should fail due to structural disruption, electrical disconnection, or short-circuiting, the ignition timing of the corresponding cylinder will accordingly be erroneous.

If the ignition timing is retarded beyond the normal ignition timing angle value, output torque is accordingly reduced, fuel consumption is increased, and an excessive increase in exhaust gas temperature results. On the other hand, if the ignition timing is advanced beyond the normal ignition timing angle value, engine knocking occurs. If the ignition timing is excessively advanced, the knocking may become so intense that, in the worst case, destruction of the engine would result.

SUMMARY OF THE INVENTION

With the above-described problem in mind, it is an object of the present invention to provide a system for controlling an engine and method therefor which avoid the disadvantages due to malfunction of any of the ignition timing control systems for separate cylinders or cylinder groups.

The above-described object can be achieved by providing a system for controlling a multi-cylinder internal combustion engine, comprising: (a) first means associated with each cylinder of the engine for monitoring internal pressure variations therein; (b) second means for determining whether the first means for any of the cylinders is malfunctioning on the basis of the pressures measured by the first means; and (c) third means for controlling the ignition timing for each cylinder on the basis of the pressures measured by the first means and retarding the ignition timing for any one of cylinders or any cylinders in which the associated first means is determined by the second means to be malfunctioning.

BRIEF DESCRIPTION OF THE DRAWINGS

A more complete understanding of the present invention may be obtained from the following description taken in conjunction with the attached drawings in which.

DETAILED DESCRIPTION OF THE PREFERRED EMBODIMENTS

Reference will be made to the drawings in order to facilitate understanding of the present invention.

Figure 1:
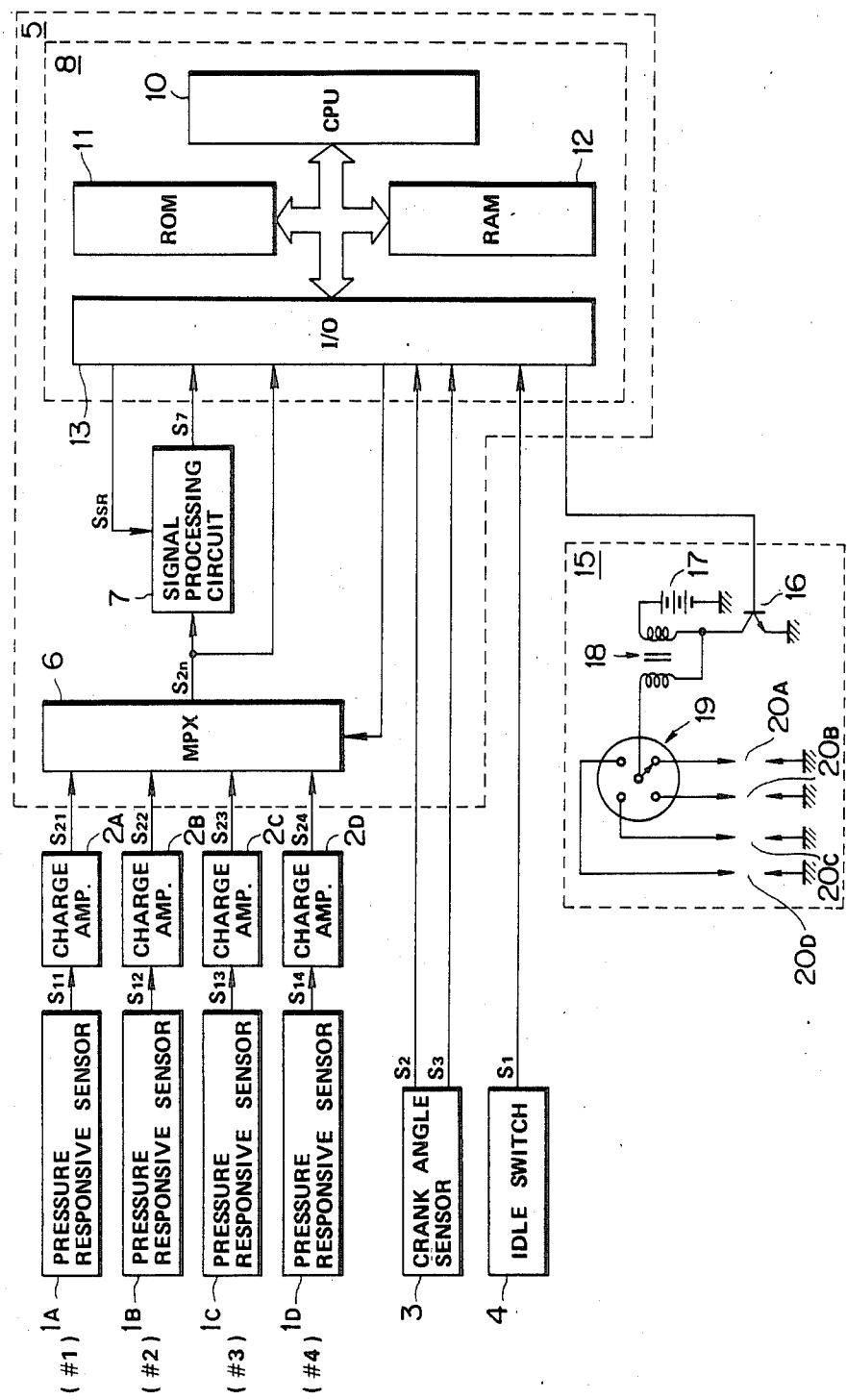
FIG. 1 is a circuit block diagram of a system for controlling an internal combustion engine in a preferred embodiment according to the present invention.

FIG. 1 is a circuit block diagram of an engine control system according to the present invention as applied to a four-cylinder internal combustion engine.

A typical piezoelectric pressure-responsive sensor 1A is installed within a first cylinder. The pressure-responsive sensor 1A is illustrated in FIGS. 2(A) and 2(B).

Figure 2A:
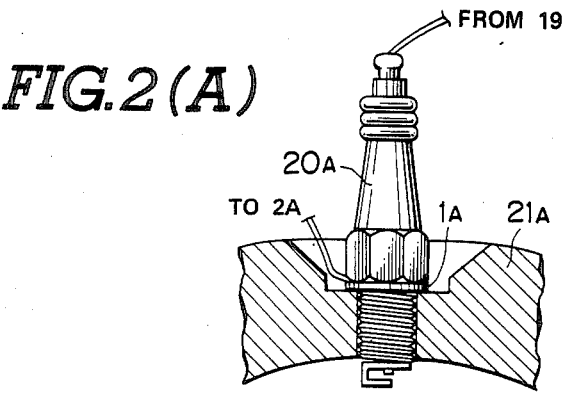
FIGS. 2(A) and 2(B) are respectively an elevation and plan view of an example of a pressure-responsive sensor, shown in FIG. 2(A) as installed in an engine cylinder.
Figure 2B:
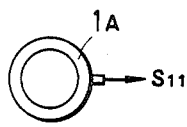

As shown in FIGS. 2(A) and 2(B), the pressure-responsive sensor 1A is mounted on the cylinder head 21A of the first cylinder as a washer for an ignition plug 20A and outputs an electrical-charge signal $S_{11}$ corresponding to the pressure within the first cylinder (internal cylinder pressure).

The other pressure-responsive sensors 1B through 1D are installed in the second through fourth cylinders respectively, specifically mounted on the respective cylinder heads in the same way as the pressure-responsive sensor 1A. They also output electrical-charge signals $S_{12}$ through $S_{14}$ representing the internal cylinder pressure levels in the second through fourth cylinders respectively. Charge amplifiers 2A through 2D then convert the electricalcharge signals $S_{11}$ through $S_{14}$ the electrically connected pressure-responsive sensors 1A through 1D into corresponding voltage signals and amplify the voltage signals to form detection signals $S_{21}$ through $S_{24}$. It should be noted that the pressure-responsive sensors 1A through 1D and charge amplifiers 2A through 2D constitute a plurality of knocking sensors.

In FIG. 1, a crank angle sensor 3 outputs a reference signal $S_2$ which consists of a pulse generated when the engine crankshaft rotates past an angular position 70° before top dead center (BTDC) in the compression stroke of each cylinder. The crank angle sensor 3 also outputs a position signal pulse $S_3$ for each one degree or two degrees of crankshaft rotation. It should be noted that the pulsewidth of the reference signal pulse $S_2$ for the first cylinder is wider than those of the other cylinders. An idling switch 4 detects whether or not the engine is idling and in such cases outputs an idling signal $S_I$ indicating that the engine is idling.

The system also includes a control unit 5 consisting predominantly of a multiplexer (MPX) 6, a signal processing circuit 7, and a main control circuit 8.

The multiplexer (MPX) 6 selects one of the detection signals $S_{21}$ through $S_{24}$ from the charge amplifiers 2A through 2D and outputs the selected signal as a detection signal $S_{2n}$.

The signal processing circuit 7 converts the single detection signal $S_{2n}$ from the multiplexer 6 into a value related to the combustion pressure vibration energy in the absence of knocking and a value related to a combustion pressure vibration energy in the presence of knocking as will be explained in detail later.

Figure 3:
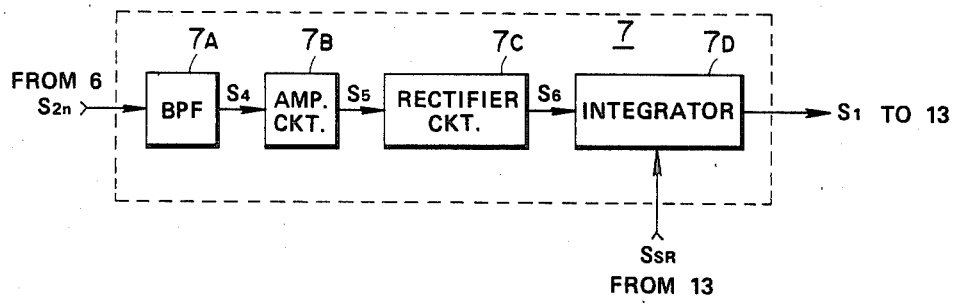
FIG. 3 is a circuit block diagram of the signal processing circuit shown in FIG. 1.

As shown in FIG. 3, a band-pass filter 7A of the signal processing circuit 7 extracts signal components within the characteristic frequency band (about six to seventeen KHz) of engine knocking from the detection signal $S_{2n}$ transmitted by the multiplexer 6. The extracted signal $S_4$ output by the band-pass filter 7A is amplified by an amplification circuit 7B and the resulting signal $S_5$ is half-rectified by a rectifying circuit 7C.

Thereafter, the half-wave rectified signal $S_6$ from the rectifying circuit 7C is integrated by an integrator 7D which is controlled by way of a set/reset signal $S_{SR}$ from the main control circuit. The integrator 7D outputs an integration signal $S_7$ representing the aformentioned combustion pressure vibration energy values, one after the other.

As shown in FIG. 1, the main control unit 8 is made up of a CPU (Central Processing Unit) 10, ROM (Read-Only Memory) 11, RAM (Random-Access Memory) 12, and I/O (Input/Output) port 13 including an A/D (Analog-to-Digital) converter. The main control circuit 8 receives the reference signal $S_2$ and position signal $S_3$ from the crank angle sensor 3, idling indicative signal $S_I$ from the idling switch 4, and integration signal $S_7$ from the signal processing circuit 7.

The main control circuit 8 outputs the set/reset signal $S_{SR}$ to the integrator 7D of the signal processing circuit 7 on the basis of the values of the reference signal $S_2$ and the position signal $S_3$.

It should be noted that the integrator 7D starts to operate at 40° before the top dead center of the compression stroke (BTDC 40°), stops at the top dead center (TDC) of the compression stroke, starts again 5° after the top dead center of the compression stroke (ATDC), and again stops 45° after TDC (ATDC 45°).

The main control circuit 8 controls ignition timing in four major steps; determination of the presence or absence of knocking, detection of malfunction of the ignition timing control system itself, determination of correction to the ignition timing, and determination of the ignition timing on the basis of various input signals such as an intake air quantity signal.

A power transistor 16 of an ignition device 15 is turned off (or on) in accordance with of the calculated ignition timing angle. Control of the ignition timing (on-and-off control of the power transistor 16) is carried out by storings values (advance angle, dwell) corresponding to the determined ignition timing in an advance angle value (ADV) register and dwell value register (DWELL) (not shown) within the I/O port 13, comparing the contents of these registers with the contents of a counter clocked by the pulses of the position signal $S_3$, rendering the transistor 16 conductive by means of an ignition command when the dwell value matches the counter value and then turning it off again when the counter value reaches the advance angle value.

When the ignition device 15 interrupts the primary current through an ignition coil 18 from a battery 17 (DC power supply) by way of the power transistor 16, a high surge voltage appears in the secondary winding of the ignition coil 18. The high surge voltage is then selectively distributed to one of a plurality of ignition plugs 20A through 20D installed within the cylinder heads of the first, second, third, and fourth cylinders via a distributor 19. The ignition plugs 20A through 20D produce a spark discharge upon receipt of the high surge voltage to ignite the air-fuel mixture supplied to the corresponding engine cylinder.

It should be noted that the main control circuit 8 carries out control operations for the engine other than the ignition timing control operation, but detailed description thereof will be omitted.

In general, knocking intensity is detected by human hearing organs and such in terms of the relative intensities of background noise generated during steady-state operation of the engine and of noise due to knocking vibrations.

Similarly, if the vibration energies in terms of internal cylinder pressure in the absence of knocking (combustion pressure vibration energy) and in the presence of knocking are directly compared, knocking intensity can be measured in close correspondence to the organic evaluation performed by humans.

Since empirically knocking does not occur before the top dead center (BTDC), the integrated, detected value of the internal combustion cylinder pressure vibration (combustion pressure vibration) may be used as an estimate of the vibration energy in the cylinder during the expansion stroke after the top dead center in the absence of knocking, whether or not the engine is actually knocking.

Hence, if the integrated value of the internal cylinder pressure vibration over a predetermined range of crank angle before top dead center is compared with that taken over the same range of crank angle after top dead center or with that taken over another matching range of crank angle including the range of crank angle before top dead center, the vibration energy in the corresponding engine cylinder in the absence of knocking can be compared directly with that measured during the combustion stroke.

It should be noted that the interval of integration must be selected so as to avoid the effects of vibration of ignition plugs as the intake and exhaust valves are seated and lifted (opened and closed). In practice, this interval is selected to be from BTDC 40° through TDC and from ATDC 5° through ATDC 45° in the preferred embodiment.

Control of the integration operation of the integrator 7D of the signal processing circuit 7 by means of the main control circuit 8 will be described below with reference to FIG. 4. In a four-cylinder engine, the ignition order is, e.g., #1 (first cylinder), #3 (third cylinder), #4 (fourth cylinder), #2 (second cylinder), and again #1 (first cylinder), ... In this case, the crank angle sensor 3 outputs a reference signal pulse $S_2$ when the crankshaft reaches 70° before top dead center (TDC) in each cylinder, as shown in (a) of FIG. 4, and outputs a position signal pulse $S_3$ for each 1° (or 2°) of crankshaft rotation as shown in (b) of FIG. 4. The pulsewidth of the reference signal pulse $S_2$ for the first cylinder is greater than that of the reference signal pulses $S_2$ for the other cylinders.

Figure 4:
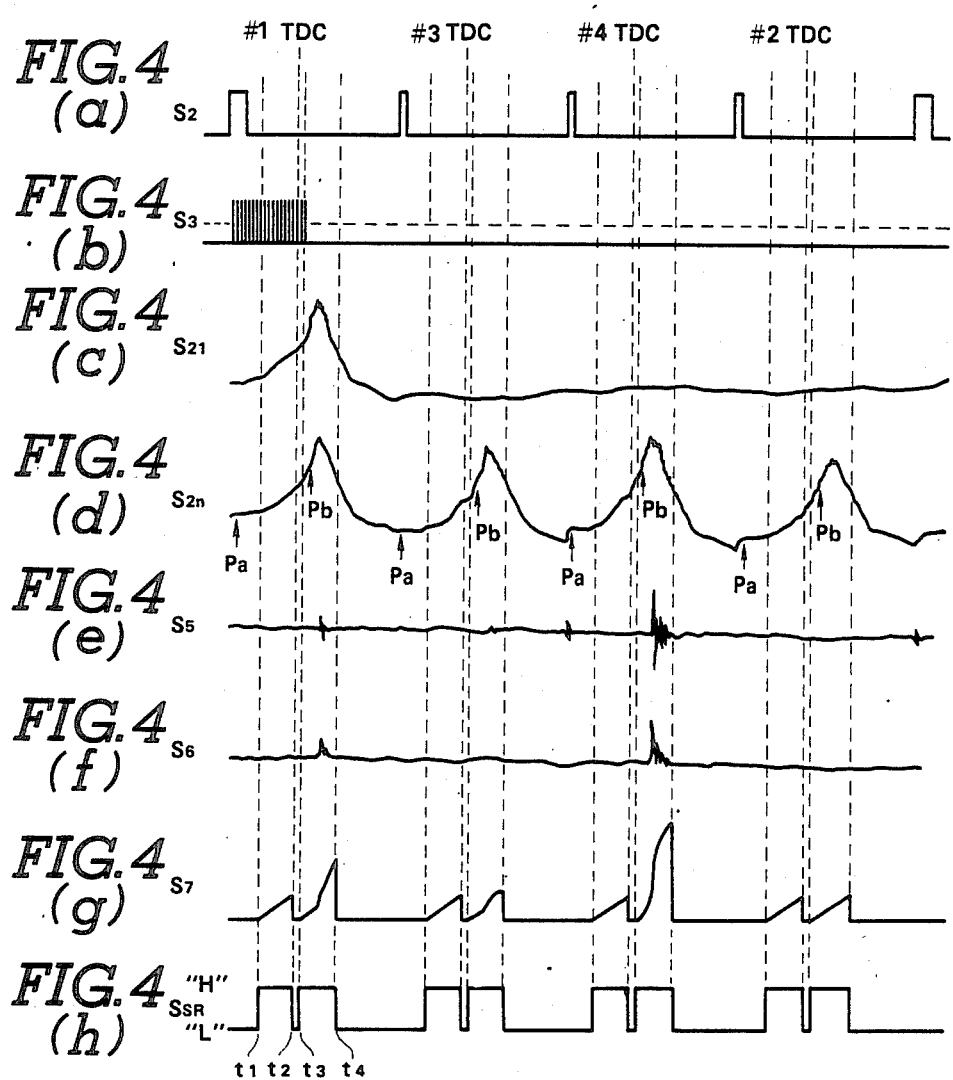
FIGS. 4(a-h) show a timing chart for explaining an integration operation performed by the integrators shown in FIG. 1.

Under normal conditions, the internal pressure-responsive sensor 1A and the charge amplifier 2A output a detection signal $S_{21}$ such as is shown in (c) of FIG. 4 and similar detection signals $S_{22}$ through $S_{24}$ are outputted by the other charge amplifiers 2B through 2D. Consequently, the multiplexer 6 outputs a multiplexed detection signal $S_{2n}$ as shown in (d) of FIG. 4. The band-pass filter 7A of the signal processing circuit 7 extracts only those signal components of the detection signal $S_{2n}$ falling within the predetermined frequency range. The amplification circuit 7B amplifies the signal from the band-pass filter 7A and outputs a amplified detection signal $S_5$, as shown in (e) of FIG. 4, to the rectification circuit 7C. The rectification circuit 7C half-rectifies the detection signal $S_5$ and sends the resulting signal $S_6$ shown in (f) of FIG. 4 to the integrator 7D.

The main control circuit 8 orders the counter to start counting the pulses of the position signal $S_3$ when the reference signal $S_2$ is received from the crank angle sensor 3.

In addition, the main control circuit 8 orders (issues a high-level ("H") set/reset signal $S_{SR}$ to) the integrator 7D to start the integration operation, e.g., at a time $t_1$ when the crankshaft reaches 40° BTDC in the first cylinder as shown in (h) of FIG. 4 and issues (issues a low-level ("L") set/reset signal $S_{SR}$ to) the integrator 7D to stop the integration operation at a time $t_2$ when the crank angle reaches top dead center (TDC).

Thereafter, the main control circuit 8 orders the integrator 7D to restart the integration operation at a time $t_3$ (ATDC 5°) and to stop again at a time $t_4$ (ATDC 45°).

An example of the integration signal $S_7$ from the integrator 7D is shown in (g) of FIG. 4. The integration timing control described above results in two separate measured values, one indicative of to the vibration energy in the absence of knocking ($t_1$ to $t_2$) and one indicative of the vibration energy in the possible presence of knocking ($t_3$ to $t_4$).

Since the main control circuit 8 controls the operation of the integrator 7D for the second, third, and fourth cylinders in the same way as for the first cylinder, the integration signal $S_7$ outputted by the integrator 7D over one complete engine cycle will be as shown in (g) of FIG. 4.

The main control circuit 8 converts the integration signal $S_7$ at each TDC into a corresponding digital value and stores sames in a predetermined address of the RAM 12 as a quantity B related to the vibration energy in the absence of knocking.

In addition, the main control circuit 8 converts the integration signal $S_7$ at each ATDC 45° into a corresponding digital value and stores same in another predetermined address of the RAM 12 as a quantity K related to the vibration energy over the period in which knocking may occur.

The ratio between quantity K and quantity B (K/B) or the difference between these quantities (K-B) is then calculated and used in a knocking control procedure to be described later to normalize the quantity K.

In general, if the internal cylinder pressure $P_a$ at an early stage of the compression stroke (internal cylinder pressure at a crank angle of, e.g., BTDC 60°) is compared with the internal cylinder pressure $P_b$ at a stage of the explosion stroke (internal cylinder pressure at a crank angle of, e.g., ATDC 10°), the following inequality will generally hold: $P_a < P_b$.

As shown in (d) of FIG. 4, the detection signal $S_{2n}$ from the multiplexer 6, which is indicative of the internal cylinder pressure, is A/D converted (analog-to-digital conversion) at BTDC 60° and at ATDC 10° so that the values $P_a$, $P_b$ indicative of the internal pressures at those times (hereinafter, referred to as "internal pressure values $P_a$ and $P_b$") are obtained. The two internal prssure values $P_a$ and $P_b$ are then compared. If $P_a \geq P_b$, the main control circuit 8 recognizes that the ignition timing control system for the corresponding engine cylinder has failed.

Figure 5:
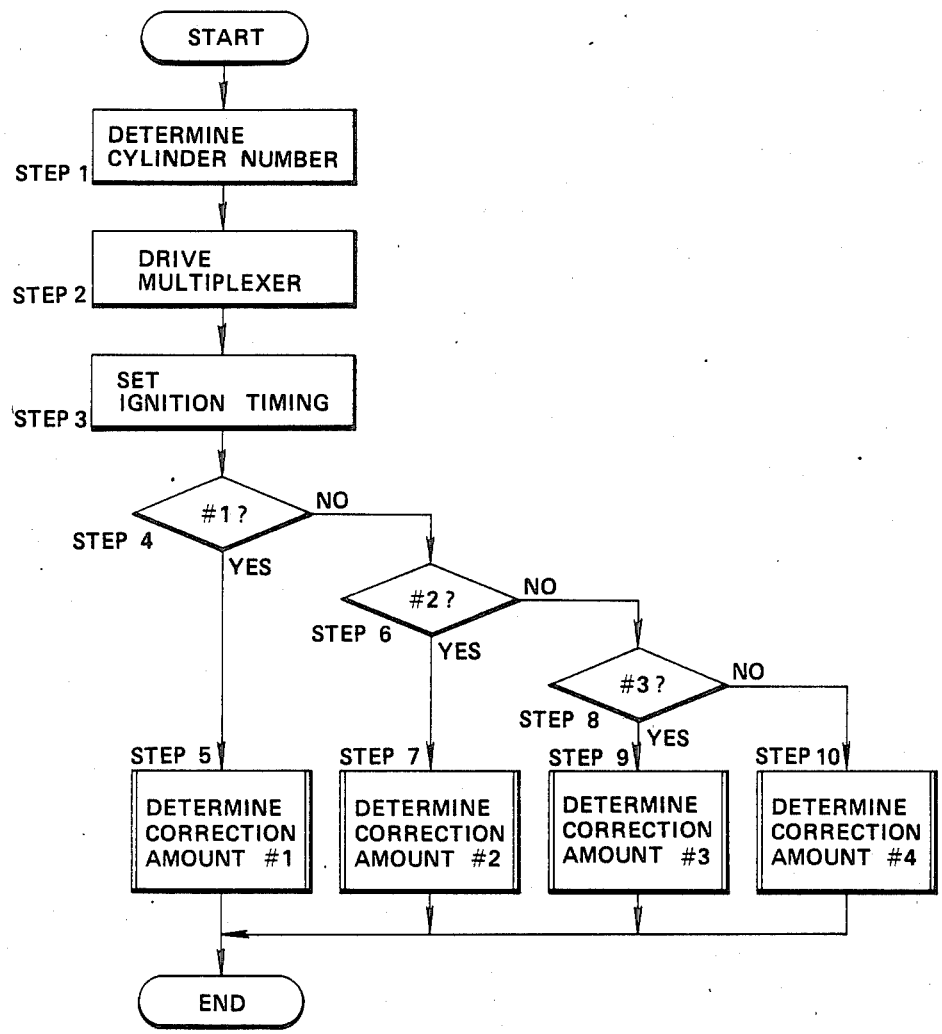
FIG. 5 is a flowchart of a program executed by the main control circuit.

In the flowchart of FIG. 5, the initial step 1 determines which of the cylinders is in its ignition stage (cylinder number determination).

Each pulse of the reference signal $S_2$ from the crank angle sensor 3 triggers an internal counter (in the I/O port 13) to start counting pulses of the position signal $S_3$. The main control circuit 8 determines from the contents of the counter after the reference signal level $S_2$ drops back to "L" whether the current cylinder to be ignited is the first cylinder and sequences ignition of the other cylinders accordingly. As mentioned previously, the pulsewidth of the reference signal $S_2$ outputted at 70° before top dead center (BTDC 70°) of the first cylinder is wider than that outputted at 70° before top dead center of the other cylinders. For example, the pulsewidth of the reference signal $S_2$ for the first cylinder may corresponds to a crankshaft rotation of about 14° and that for the second, third, and fourth cylinders may correspond to 4° to 5°.

If the pulsewidth of the inputted reference signal $S_2$ is measured and the value of the counter corresponds to crankshaft rotation through equal to or greater than 10°, the current cylinder is recognized to be the first cylinder and the other cylinders can be identified by subsequent reference signal pulse $S_2$ in the order third cylinder (#3), fourth cylinder (#4), and then second cylinder (#2).

In a STEP 2, the multiplexer 6 is actuated so that the proper one of the detection signals $S_{21}$ through $S_{24}$ is selectively outputted as the detection signal $S_{2n}$ according to the results of the cylinder number determination performed at STEP 1.

In the next STEP 3, the integrator 7D in the signal processing circuit 7 is activated for the intervals between BTDC 45° and TDC and between ATDC 5° and ATDC 45°. The integrator 7D is triggered by a high-level ("H") set/reset signal $S_{SR}$ from the main control circuit 8.

STEP 4 through STEP 10 form a logical cascade leading to correction amount determination processes for the first, second, third, and fourth cylinders, by which malfunction of the ignition timing control system for each cylinder can be detected and a correction amount can be derived for each cylinder according to the current cylinder number (#1 through #4).

Figure 6:
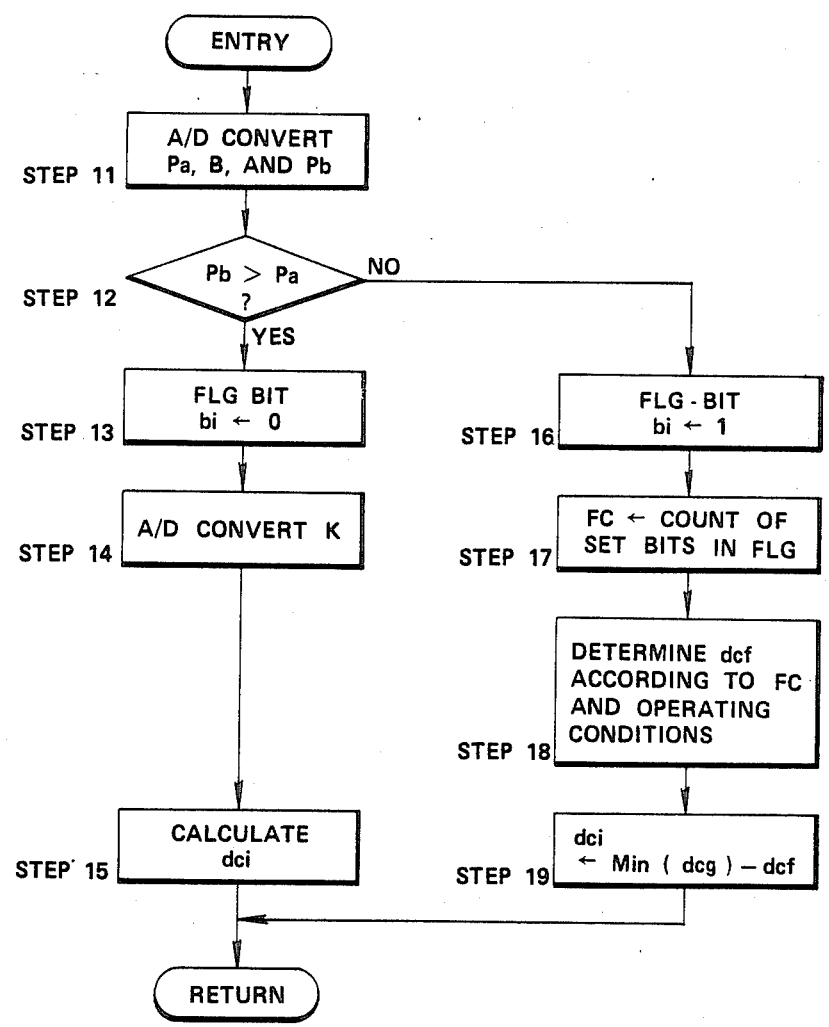
FIG. 6 is a flowchart of a routine for deriving correction amounts for use in the program shown in FIG. 5.

FIG. 6 is a more detailed flowchart of the aforementioned correction amount determination process for the cylinder numbered i (i=1 through 4 in the case of a four-cylinder engine) in STEP 5, 7, 9 and 10.

Before explaining each step shown in FIG. 6, the meaning of abbreviations used in FIG. 6 (except those already described) will be described below.

FLG: a four-bit flag indicating the occurrence or absence of malfunction in each of the ignition timing control systems for the four cylinders, the first bit $b_0$ indicating the above-described state for the first cylinder, the second bit $b_1$ indicating that for the second cylinder, the third bit $b_2$ indicating that for the third cylinder, and the fourth bit $b_3$ indicating that for the fourth cylinder.

dci: a correction to the ignition timing for each cylinder, $dc_1$ indicating the correction amount for the first cylinder, $dc_2$ indicating the correction amount for the second cylinder, $dc_3$ indicating the correction amount for the third cylinder, and $dc_4$ indicating the correction amount for the fourth cylinder. If $dci \geq 0$, the symbol dci represents the correction amount by which the ignition timing is to be offset to the advance side. If $dci<0$, the symbol dci represents the correction amount by which the ignition timing is to be offset to the retardation side. As the correction amount increases, the ignition timing offset further toward the extreme of advance angle.

Min (dcg): the most negative correction amount among the correction amounts (dci) for all of the engine cylinders whose associated ignition timing control systems are operating normally.

dcf: a retardation ignition timing angle value for any cylinders that have been recognized to have a malfunctioning ignition timing control system. It is noted that the value of dcf is negative and the ignition timing is further retarded as its absolute value increase.

The process by which the correction amount for the number i cylinder (i=1 through 4) is derived will be described below with reference to FIG. 6.

The detection signal for the number i cylinder is selectively outputted by means of the multiplexer 6 as the detection signal $S_{2n}$ to the signal processing circuit 7.

In a STEP 11, the detection signal $S_{2n}$ is A/D converted (analog-to-digital) at BTDC 60° and at ATDC 10° to derive the internal pressure values $P_a$ and $P_b$. Furthermore, the half-wave rectified and integrated output signal $S_7$ is A/D converted at TDC to derive the quantity B.

In the next STEP 12, the background pressure value $P_a$ is compared with the other value $P_b$ to determine whether $P_b>P_a$. In this way, the main control circuit 8 determines whether the ignition timing control system for the corresponding cylinder (i) is operating normally.

If $P_b>P_a$, i.e., if the ignition timing system for the number i cylinder (including the corresponding knocking sensor) is operating normally, the bit $b_i$ in flag FLG indicating the presence or absence of malfunction for the i cylinder is reset to "0" in the STEP 13 and stored in a predetermined address of the RAM 12. In practice, if the number i cylinder is the first cylinder, the logical product of the flag FLG (bits $b_3$ through $b_0$) and the value "1110" is found (FLG×1110) so that the least significant bit $b_0$ is reset to "0". Similarly, if the cylinder number i is the second (i=2), the logical product of the flag FLG (bits $b_3$ through $b_0$) and "1101" is found so that the second least significant bit $b_1$ is reset to "0". If the cylinder number i is the third (i=3), the logical product of the flag FLG (bits $b_3$ through $b_0$) and "1011" (FLG×1011) is found so that the third least significant bit $b_2$ is reset to "0". If the cylinder number i is the fourth (i=4), the logical product of the flag FLG and "0111" is found (FLG×0111) so that the most significant bit $b_3$ is reset to "0".

In addition, the half-wave rectified integrated output signal $S_7$ is A/D converted at ATDC 45° to derive the quantity K in a STEP 14. Thereafter, the correction amount dci for the ignition timing of the number i cylinder is calculated.

On the other hand, if $P_b \leq P_a$ in the STEP 12, i.e., if an abnormality (malfunction) arises in the ignition timing control system for the number i cylinder, the bit $b_i$ of the flag FLG is set to "1" in the STEP 16 and the main control circuit 8 stores the flag FLG in the predetermined address of the RAM 12. In practice, the first bit $b_0$ of the flag FLG is set to "1" by finding the logical sum of the flag FLG (bits $b_3$ through $b_0$) and "0001" (FLG+0001). The second bit $b_1$ of the flag FLG is set to "1" by finding the logical sum of the flag FLG (bits $b_3$ through $b_0$) and "0010" to set the second bit $b_1$ to "1", in the case of the second cylinder. The bit $b_2$ of the flag FLG is set to "1" by taking the logical sum (FLG+0100) of the flag FLG (bits $b_3$ through $b_0$) and "0100" to set the third bit $b_2$ of the flag FLG to "1", in the case of the third cylinder. The bit $b_3$ of the flag FLG is set to "1" by finding the logical sum (FLG+1000) of the flag FLG (bits $b_3$ through $b_0$) and "1000" to turn the fourth bit $b_3$ of the flag FLG to "1". Thereafter, in STEP 17, the number of bits which are set to "1", i.e., the number of the ignition timing control systems determined to be malfunctioning is counted and the counted number of malfunctions FC is stored in a predetermined area of the RAM 12.

The value of the retardation angle correction dcf is determined according to the counted number of malfunctions FC and according to engine operating conditions. For example, $-(FC \times 2)$ degrees may be used as the retardation angle correction amount dcf for cylinders whose associated ignition timing control system are malfunctioning. In this case, if detected engine operating conditions fall within a predetermined region, e.g., if the engine revolution speed is above 4000 rpm, the ignition timing is further retarded by a predetermined value (for example, 2 deg) from the value dcf and the value (dcf −2) is used as an additional correction to the retardation angle dcf.

The value (Min (dcg) −dcf) obtained by subtracting the retardation angle correction amount dcf calculated in the STEP 18 from the minimum correction amount Min (dcg) among the normally operating engine cylinders is adopted as the correction amount dci of the ignition timing angle in the number i cylinder.

In other words, when one of the knocking sensors fails, the ignition timing for the corresponding cylinder is retarded so as to match the ignition timing of the cylinder in which the respective knocking sensor is operating normally and which is least likely to start knocking, i.e., which is most retarded by the retardation angle correction amount dcf.

Figure 7:
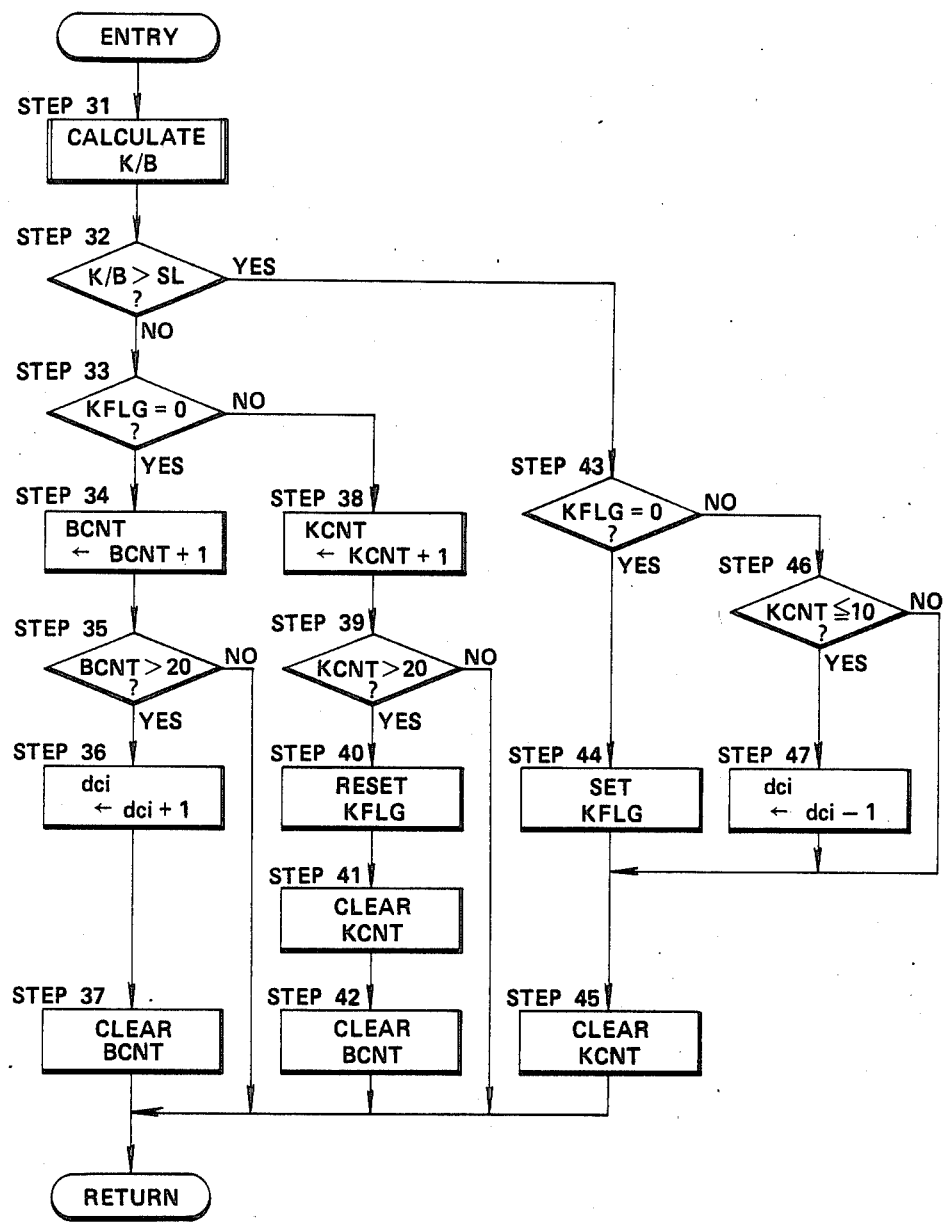
FIG. 7 is a flowchart of an ignition timing correction amount calculation routine for use in the routine of FIG. 6.

The process (STEP 15) of calculating the correction amount for the ignition timing during normal operation will be described with reference to FIG. 7. First, the meaning of abbreviations used in FIG. 7 (the abbreviations already discussed will be omitted) will be explained.

SL: a reference value used to determine the presence or absence of engine knocking.

BCNT: a value indicating the number of times the ignition has been carried out since the flag KFLG was last reset (hereinafter referred to as "count value BCNT")

KCNT: a value indicating the number of times the ignition has been carried out since the flag KFLG was last set (hereinafter referred to as "count value KCNT")

It should be noted that values of KFLG, KCNT, and BCNT for the determination process of the correction amount for each cylinder are independent.

First, the ratio (K/B value) of the quantity B which is the vibration energy value in the absence of knocking to the quantity K which is the vibration energy value in the possible presence of knocking is calculated to normalize the quantity K relative to the quantity B. In this way, K/B is calculated in STEP 31.

The K/B value is compared to a reference value SL in STEP 32 to determine whether K/B>SL (the main control unit 8 determines whether knocking has occurred on the basis of this comparison). If K/B>SL, i.e., if knocking has occurred, the routing goes to a STEP 43 to be described later. On the other hand, if K/B≦SL, i.e., if no knocking has occurred, the routine goes to a STEP 33 in which the circuit 8 determines whether the flag KFLG has previously been reset to "0". If so, i.e., if no knocking has occurred recently, the routine goes to steps STEP 34 through STEP 37 which serve to advance the ignition timing one degree if the condition K/B≧SL persists for more than 20 cycles since the last occurrence of knocking.

That is to say, after the count value BCNT is incremented (+1) in STEP 34, the circuit 8 determines whether the count value BCNT exceeds "20" (BCNT>20) in the STEP 35. If not BCNT>20 (BCNT≦20), the routine ends. If BCNT>20, the correction amount dci is incremented by one degree (+1) in the STEP 36 to advance the current ignition timing. Thereafter, in the STEP 37, the routine ends after the count value BCNT is cleared (BCNT=0) in the STEP 37.

If the flag KFLG is not equal to "0" in STEP 33, i.e., if knocking has occurred in the recent past, the routine goes to steps STEP 38 through STEP 42. If the condition K/B≦SL holds for up to 20 cycles from the last time at which K/B>SL, the sequence STEP 38 to STEP 42 helps avoid recurrence of knocking.

After the count value KCNT is incremented by one (+1) in the STEP 38, the circuit 8 determines whether the count value KCNT now exceeds "20" (KCNT>20). If KCNT≦20, the routine ends directly. If KCNT>20, the flag KFLG is reset in the STEP 40. Thereafter, the count value KCNT is cleared in the STEP 41 (KCNT=0). The count value BCNT is then cleared in the STEP 42 and the routine ends.

When K/B>SL in the STEP 32, i.e., when knocking has occurred, the circuit 8 checks to see whether the flag KFLG is equal to "0" in the STEP 43 so as to determine whether or not this is the first occurrence of knocking.

At this time, if the flag KFLG is at "0", i.e., if this is the first occurrence of knocking, the flag KFLG is set (KFLG=1) in the STEP 44. Thereafter, the count value KCNT is cleared in the STEP 45 to end the routine.

On the other hand, if the flag KFLG is set to 37 1", i.e., if this is not the first occurrence of knocking, the routine determines whether the immediately preceding occurrence of knocking was within the last ten cycles (KCNT≦10), i.e., if the inequality K/B≦SL previously held for less than of equal to 10 cycles. If KCNT>10, the routine ends following execution of STEP 45. On the other hand, if KCNT≦10, the correction amount dci of the ignition timing is decremented by one (−1) in the STEP 47 to retard the ignition timing angle value. Following execution of STEP 45 described above, the routine ends.

In this way, when the knocking has occurred, the number of times the knocking has occurred (the frequency of knocking generation) is determined and the correction to the ignition timing is determined on the basis of the detected frequency of occurrence of knocking.

It should be noted that in STEP 36 and STEP 47, the circuit 8 determines whether the correction amount dci after the execution of the correction exceeds a predetermined value, so that the ignition timing angle is constrained to within a predetermined maximum advance angle and a predetermined maximum retardation angle.

In addition, the retardation angle decrement in the STEP 47 need not be one degree but may be set to ½ or ¼ degrees. In addition, the retardation decrement may be related to the magnitude of the K/B value, i.e., intensity or degree of knocking.

Figure 8:
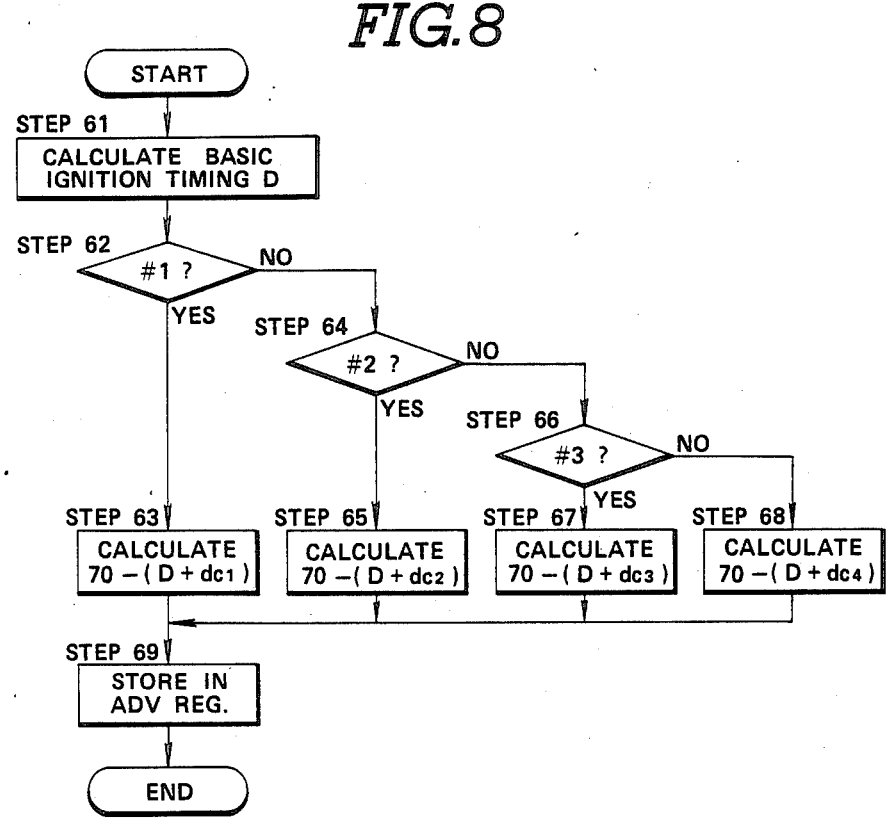
FIG. 8 is a flowchart of an ignition timing program making use of the results of the program of FIG. 5.

The ignition timing control process itself will be described with reference to FIG. 8. It starts in response to a pulse in the reference signal $S_2$ from the crank angle sensor 3.

Figure 9:
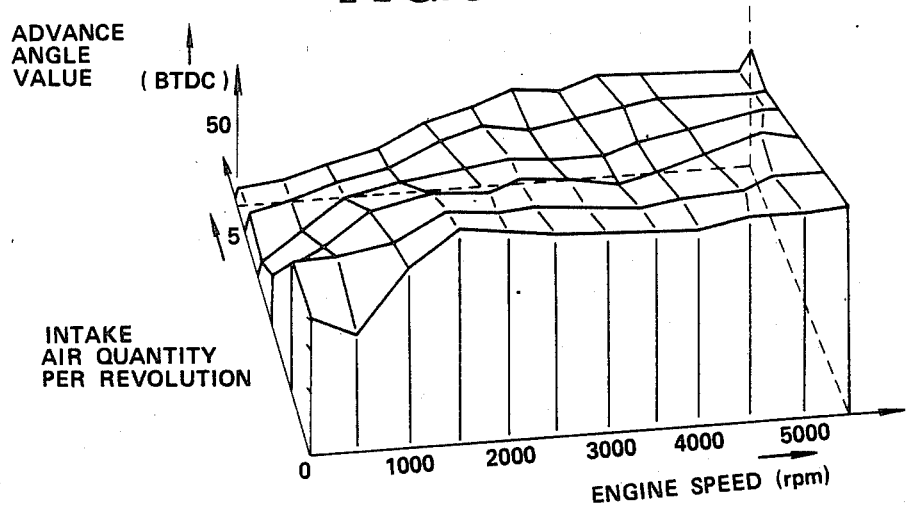
FIG. 9 is a graph of ignition advance versus engine revolution speed and intake air quantity for use in explaining the basic ignition timing angle calculation performed by the program of FIG. 8.

In STEP 61, a basic ignition timing value D is derived according to the intake air quantity and engine revolution speed. The circuit 8 may derive the basic ignition timing value D by way of the table look-up technique in which it retrieves the desired value from an array indexed on intake air quantity and engine speed stored in the ROM 11, such as is shown in FIG. 9.

Following STEP 61, STEPs 62, 64 and 66 direct the routine to one of STEPs 63, 65, 67 and 68 according to the current cylinder number i. These latter steps use the correction dci and the basic ignition timing value D to calculated the value 70−(D+dci). After calculating {70−(D+dci)}, it is converted into terms of angle of crankshaft rotation relative to the input timing of the reference signal $S_2$ and the calculation result is stored in the advance angle value (ADV) register described above in the I/O port 13 in the STEP 69.

In this way, when ignition timing control system for one or more cylinders malfunctions, the ignition timing for that or those cylinders is controlled so as to be held to a predetermined extent on the retarded side of the ignition timing for the normally operating cylinders.

Therefore, even if malfunctions arise in the ignition timing control system for some of the cylinders, such disadvantages as loss of output torque, excessive fuel consumption, increased exhaust gas temperature, and knocking can be suppressed.

As a possible alternative not adopted in this invention, the ignition timing for the cylinder with the malfunctioning ignition timing control system could be controlled to coincide with that of the normally operated cylinders instead of being offset to the retarded side of the ignition timing for the other normally operating cylinders. However, different cylinders have different characteristics. Therefore, if the ignition timing(s) of the abnormally operating cylinder(s) is matched with the ignition timing of the normally operating cylinder(s) whose ignition timing is relatively advanced, knocking will occur. Conversely, matching ignition timing to an excessively retarded level will also have well-known disadvantages.

Thus, in order to prevent or suppress knocking due to the normal distribution of characteristics among cylinders, in the invention, the ignition timing(s) for the abnormal cylinder(s) are offset by a predetermined angle to the retardation side of that of the normal cylinder(s).

In this case, although the distribution of characteristics among the cylinders can be compensated for to a considerable degree when there are many normal cylinders and only the one of the cylinders with the most retarded ignition timing is malfunctioning, the extreme value within the distribution among the cylinders had best be used.

In the above-described preferred embodiment, the predetermined offset is based on the number of normal cylinders in order to avoid the possible disadvantages due to malfunction of any of the ignition timing control systems without unnecessary retardation of the ignition timing.

In addition, since knocking at high engine speeds range would adversely affect the engine, the predetermined ignition timing offset is increased according to the engine operating conditions in the preferred embodiment.

The ignition timing control procedure is exemplified below for the case of a six-cylinder engine. In this case, the predetermined retardation offset is set to (number of abnormal cylinders × 2) degrees.

(1) Assume that one of the six cylinders is operating abnormally and the other five cylinders are normal, and that the respective ignition timings for the other five cylinders are BTDC 30°, BTDC 28°, BTDC 26°, BTDC 24°, and BTDC 26°. Then (most retarded cylinder = 24° BTDC — the number of abnormal cylinders 1×2) = 24−2 = 22° BTDC. Thus, the ignition timing for the abnormal cylinder is changed to 22° BTDC.

(2) Assume that three cylinders are abnormal, the other three cylinders are normal, and the respective ignition timings for the normal three cylinders are BTDC 30°, BTDC 28°, and 26° BTDC. Then the ignition timing for all of the abnormal cylinders is changed to (most retardation angle cylinder 26° BTDC − the number of abnormal cylinders 3×2) = 26−6 = 20° BTDC.

(3) In a particular engine operating region, the ignition timing value for the above items (1) and (2) is further retarded, e.g., by 2°.

It should be noted that instead of installing the internal pressure-responsive sensors on the ignition plugs, the pressure-responsive sensors may be mounted on the cylinder blocks.

The present invention may be applied to a so-called MBT (Minimum spark advance for Best Torque) control system in which the ignition timing is controlled so that the internal pressure is held at a maximum. This ignition timing control is also carried out on the basis of knocking detection in each cylinder in the above-described preferred embodiment. The MBT control procedure is exemplified in detail by pending U.S. patent application Ser. No. 749,441 filed on June 27, 1985, the contents of which are hereby incorporated by reference.

Furthermore, although in the preferred embodiment the ignition timing control is carried out separately for each of the cylinders, the present invention is also applicable to ignition timing control systems by cylinder group, wherein a plurality of cylinders constitute a single, independently-controlled group.

It will clearly be understood by those skilled in the art that the foregoing description is made in terms of the preferred embodiment and various changes and modifications may be made without departing from the scope of the present invention which is to be defined by the appended claims.

What is claimed is:

1. A system for controlling a multi-cylinder internal combustion engine, comprising:
   (a) first means associated with each cylinder of the engine for monitoring internal pressure variations therein;
   (b) second means for determining whether said first means for any of the cylinders is malfunctioning on the basis of the pressures measured by said first means; and
   (c) third means for controlling the ignition timing for each cylinder on the basis of the pressures measured by said first means and retarding the ignition timing for any one of cylinders or any cylinders in which the associated first means is determined by said second means to be malfunctioning.

2. The system according to claim 1, wherein said third means retards the ignition timing for the cylinder or cylinders in which the associated first means is malfunctioning by a predetermined retardation offset with respect to the ignition timing for another cylinder in which the associated first means has not been determined to be malfunctioning.

3. The system according to claim 2, wherein the most retarded ignition timing among the other cylinders associated with properly operating first means is used in deriving the retarded ignition timing for cylinders associated with malfunctioning first means.

4. The system according to claim 3, which further comprises fourth means for detecting and signalling the number of cylinders associated with malfunctioning first means and wherein said predetermined retardation offset is related to the number of cylinders detected by said fourth means.

5. The system according to claim 4, which further comprises fifth means for detecting and signalling engine operating conditions and wherein said predetermined retardation offset is related to the detected engine operating conditions.

6. The system according to claim 5, wherein said fifth means detects and signals engine revolution speed and said predetermined retardation offset increases as the detected engine revolution speed increases.

7. The system according to claim 5, wherein said fifth means detects and signals engine revolution speed and said predetermined retardation offset increases by a predetermined angle value when the detected engine revolution speed increases and exceed a predetermined speed value.

8. The system according to claim 1, wherein said first means comprises a plurality of pressure-responsive sensors, each mounted on a corresponding engine cylinder for detecting the internal pressure in the corresponding cylinder and outputting a signal indicative thereof.

9. The system according to claim 8, wherein said pressure-responsive sensors are piezoelectirc elements attached to an ignition plug installed in the corresponding cylinder.

10. The system according to claim 8, wherein said pressure-responsive sensors are mounted on cylinder blocks.

11. The system according to claim 1, wherein said second means comprises: (a) fourth means for deriving first and second values of the internal pressure in each cylinder monitored by said first means, said first value being measured at a time corresponding to a first predetermined crank angular position before top dead center in the compression stroke and said second value being measured at a time corresponding to a second predetermined crank angular position after top dead center in the explosion stroke; and (b) fifth means for comparing said first and second values and recognizing that the first means for the corresponding cylinder is malfunctioning when said first value equals or is greater than said second value and that the first means for the corresponding cylinder is operating normally when said first value is less than said second value.

12. The system according to claim 1, wherein said third means comprises:
(a) fourth means for determining whether knocking occurs in each cylinder on the basis of the measured pressure therein;
(b) fifth means for determining whether a predetermined number of ignition cycles of the corresponding cylinder has passed during which said fourth means determines that no knocking is occuring in the corresponding cylinder; and
(c) sixth means for advancing the ignition timing by a predetermined advance offset when said fifth means determines that the predetermined number of ignition cycles has passed.

13. The system according to claim 12, which further comprises: (a) seventh means for noting when knocking first occurs when said fourth means determines that knocking has occurred; (b) eighth means for measuring the frequency of occurrence of knocking detected by said fourth means; and (c) ninth means for retarding the ignition timing by a predetermined retardation offset when said eighth means determines that the frequency of occurrence of knocking exceeds a predetermined limit.

14. The system according to claim 12, wherein said sixth means advances the ignition timing by one degree of engine rotation.

15. The system according to claim 13, wherein said ninth means retards the ignition timing by one degree of engine rotation.

16. The system according to claim 1, wherein said third means comprises:

(a) fourth means for detecting the angular position of an engine crankshaft when the internal pressure of the corresponding cylinder reaches its maximum;
(b) fifth means for deriving the average of the crankshaft angular positions detected by said fourth means;
(c) sixth means for comparing the average value derived by said fifth means with a target value at which the output torque of the engine is maximized; and
(d) seventh means for correcting the ignition timing for the corresponding cylinder on the basis of the comparison performed by said sixth means.

17. A system for controlling a multi-cylinder internal combustion engine, comprising:
(a) first means for monitoring internal pressure variations in each group of cylinders;
(b) second means for determining whether said first means for any one group of cylinders is malfunctioning on the basis of the pressures measured by said first means; and
(c) third means for controlling an ignition timing in each group of cylinders on the basis of the pressures measured by said first means and retarding the ignition timing for any cylinder groups associated with malfunctioning first means.

18. A method for controlling a multi-cylinder engine, comprising the steps of:
(a) providing a sensor on each engine cylinder or on each group of engine cylinders for monitoring internal pressure variations therein;
(b) determining whether an engine knocking occurs in each cylinder or in each cylinder group on the basis of each corresponding result of monitoring in said step (a);
(c) retarding an ignition timing in each cylinder or in each cylinder group when determining in said step (b) that the engine knocking occurs and advancing an ignition timing therein when determining in said step (b) that no engine knocking occurs;
(d) determining whether any one of the sensors is malfunctioning on the basis of each corresponding result of monitoring in said step (a); and
(e) retarding the ignition timing advanced in said step (c) of the corresponding cylinder or cylinder group associated with the sensor which is determined to be malfunctioning in said step (d).

19. A method for controlling a multi-cylinder engine, comprising the steps of:
(a) monitoring internal pressure variations in each cylinder of the engine by means of sensors;
(b) determining whether any of the sensors are malfunctioning on the basis of the pressures measured in said step (a);
(c) controlling the ignition timing in each cylinder on the basis of the pressures measured in said step (a); and
(d) retarding the ignition timing in any one of the cylinders or any cylinders associated with a sensor determined to be malfunctioning in said step (b).

20. The method according to claim 19, wherein the ignition timing in cylinders associated with malfunctioning sensors is retarded by a predetermined retardation offset with respect to the ignition timing in another cylinder associated with a properly operating sensor.

21. The method according to claim 20, wherein the most retarded ignition timing among the cylinders associated with properly operating sensors is used to derive the ignition timing for cylinders associated with malfunctioning sensors.

* * * * *